(12) United States Patent
Arreaza et al.

(10) Patent No.: US 12,090,988 B2
(45) Date of Patent: Sep. 17, 2024

(54) CONNECTED VEHICLE ROAD-SAFETY INFRASTRUCTURE INSIGHTS

(71) Applicant: GM Global Technology Operations LLC, Detroit, MI (US)

(72) Inventors: Carlos Eduardo Arreaza, Oakville (CA); Amin Abdossalami, Markham (CA); Joseph K. Moore, Whitby (CA); Halit Zengin, Courtice (CA); Donald K. Grimm, Utica, MI (US); Shawn F. Granda, Troy, MI (US); Yue Zhuang, Plymouth, MI (US); Harnit Kaur Anand, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 268 days.

(21) Appl. No.: 17/511,137

(22) Filed: Oct. 26, 2021

(65) Prior Publication Data

US 2023/0131124 A1    Apr. 27, 2023

(51) Int. Cl.
*B60W 10/20* (2006.01)
*B60W 30/09* (2012.01)
*B60W 30/095* (2012.01)

(52) U.S. Cl.
CPC ............ *B60W 10/20* (2013.01); *B60W 30/09* (2013.01); *B60W 30/0956* (2013.01); *B60W 2510/20* (2013.01); *B60W 2554/4026* (2020.02); *B60W 2554/4029* (2020.02); *B60W 2556/50* (2020.02)

(58) Field of Classification Search
CPC .. B60W 10/20; B60W 30/09; B60W 30/0956; B60W 2510/20; B60W 2554/4026; B60W 2554/4029; B60W 2556/60; G08G 1/0141; G08G 1/0112
See application file for complete search history.

(56) References Cited

U.S. PATENT DOCUMENTS

| | | | |
|---|---|---|---|
| 10,166,991 B1* | 1/2019 | Bai | G08G 1/0112 |
| 11,138,880 B2* | 10/2021 | Smith | G08G 1/0112 |
| 2016/0133130 A1* | 5/2016 | Grimm | G08G 1/0129 340/905 |
| 2018/0348365 A1* | 12/2018 | Achour | H01Q 3/46 |
| 2019/0051168 A1* | 2/2019 | Du | G08G 1/09 |
| 2020/0211376 A1* | 7/2020 | Roka | G01C 21/3492 |
| 2020/0286370 A1* | 9/2020 | Wickramarathne | G08G 1/0112 |
| 2021/0020073 A1* | 1/2021 | Asmari | G09B 29/007 |
| 2021/0097854 A1* | 4/2021 | Guim Bernat | G08G 1/0141 |
| 2021/0108966 A1* | 4/2021 | Kuepper | G06V 20/56 |
| 2021/0144517 A1* | 5/2021 | Guim Bernat | H04L 9/3247 |
| 2021/0372809 A1* | 12/2021 | Warner | B60K 35/28 |
| 2022/0319336 A1* | 10/2022 | Averbuch | G08G 1/0141 |

* cited by examiner

*Primary Examiner* — Kurt Philip Liethen
(74) *Attorney, Agent, or Firm* — Vivacqua Crane, PLLC

(57) ABSTRACT

A system comprises a computer including a processor and a memory. The memory includes instructions such that the processor is programmed to receive geoindexed detected vehicle event data from at least one vehicle occurring within a predefined time period, normalize the geoindexed detected vehicle event data according to Global Position System (GPS) data corresponding to a geoindex map, and generate an infrastructure recommendation based on the normalized and aggregated geoindexed detected vehicle event data.

20 Claims, 5 Drawing Sheets and ultrasonic transducers. Other sensors can also include wheel speed sensors, inertial measurement unit sensors, electronic power steering sensors, or steering wheel angle sensors. Vehicles can actuate the sensors to collect data while traveling along roadways. Based on the data, it is possible to determine parameters associated with the vehicle. For example, sensor data can be indicative of objects relative to the vehicle.

CONNECTED VEHICLE ROAD-SAFETY INFRASTRUCTURE INSIGHTS

The present disclosure relates to determining infrastructure insights based on vehicle data received from multiple vehicles.

Vehicles use sensors to collect data while operating, the sensors including radar, lidar, vision systems, infrared systems, and ultrasonic transducers. Other sensors can also include wheel speed sensors, inertial measurement unit sensors, electronic power steering sensors, or steering wheel angle sensors. Vehicles can actuate the sensors to collect data while traveling along roadways. Based on the data, it is possible to determine parameters associated with the vehicle. For example, sensor data can be indicative of objects relative to the vehicle.

SUMMARY

A system comprises a computer including a processor and a memory. The memory includes instructions such that the processor is programmed to receive geoindexed detected vehicle event data from at least one vehicle occurring within a predefined time period, normalize the geoindexed detected vehicle event data according to Global Position System (GPS) data corresponding to a geoindexed map, and generate an infrastructure recommendation based on the normalized and aggregated geoindexed detected vehicle event data.

In other features, the processor is further programmed to compare a density of detected vehicle events to a predetermined density threshold within the predefined time period; and generate the infrastructure recommendation based on the normalized and aggregated geoindexed detected vehicle event data and the density of detected vehicle events based on the comparison.

In other features, the processor is further programmed to generate the infrastructure recommendation based on the normalized and aggregated geoindexed detected vehicle event data and the density of detected vehicle events when the density of detected vehicle events is greater than the predetermined density threshold.

In other features, the processor is further programmed to transmit the infrastructure recommendation to one or more entities.

In other features, at least one entity of the one or more entities comprises a municipality.

In other features, the processor is further programmed to cluster the geoindexed detected vehicle event data based on a type classification of the geoindexed detected vehicle event data.

In other features, the type classification comprises at least one of pedestrian classification, a motorcyclist classification, or a cyclist classification.

In other features, the geoindexed detected vehicle event data comprises vehicle event data detected by an advanced driver-assistance system (ADAS) of the vehicle.

In other features, the geoindexed detected vehicle event data comprises vehicle event data detected by an active safety system of the vehicle.

In other features, the infrastructure recommendation comprises at least one of a cyclist infrastructure recommendation, a vehicle infrastructure recommendation, or a pedestrian infrastructure recommendation.

A method includes receiving, via a processor, geoindexed detected vehicle event data from at least one vehicle occurring within a predefined time period, normalizing the geoindexed detected vehicle event data according to Global Position System (GPS) data corresponding to a geoindexed map, and generating an infrastructure recommendation based on the normalized and aggregated geoindexed detected vehicle event data.

In other features, the method includes comparing a density of detected vehicle events to a predetermined density threshold within the predefined time period, and generating the infrastructure recommendation based on the normalized and aggregated geoindexed detected vehicle event data and the density of detected vehicle events based on the comparison.

In other features, the method includes generating the infrastructure recommendation based on the normalized and aggregated geoindexed detected vehicle event data and the density of detected vehicle events when the density of detected vehicle events is greater than the predetermined density threshold.

In other features, the method includes transmitting the infrastructure recommendation to one or more entities.

In other features, at least one entity of the one or more entities comprises a municipality.

In other features, the method includes clustering the geoindexed detected vehicle event data based on a type classification of the geoindexed detected vehicle event data In other features, the type classification comprises at least one of pedestrian classification, a motorcyclist classification, or a cyclist classification.

In other features, the geoindexed detected vehicle event data comprises vehicle event data detected by an advanced driver-assistance system (ADAS) of the vehicle.

In other features, the geoindexed detected vehicle event data comprises vehicle event data detected by an active safety system of the vehicle.

In other features, the infrastructure recommendation comprises at least one of a cyclist infrastructure recommendation, a vehicle infrastructure recommendation, or a pedestrian infrastructure recommendation.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
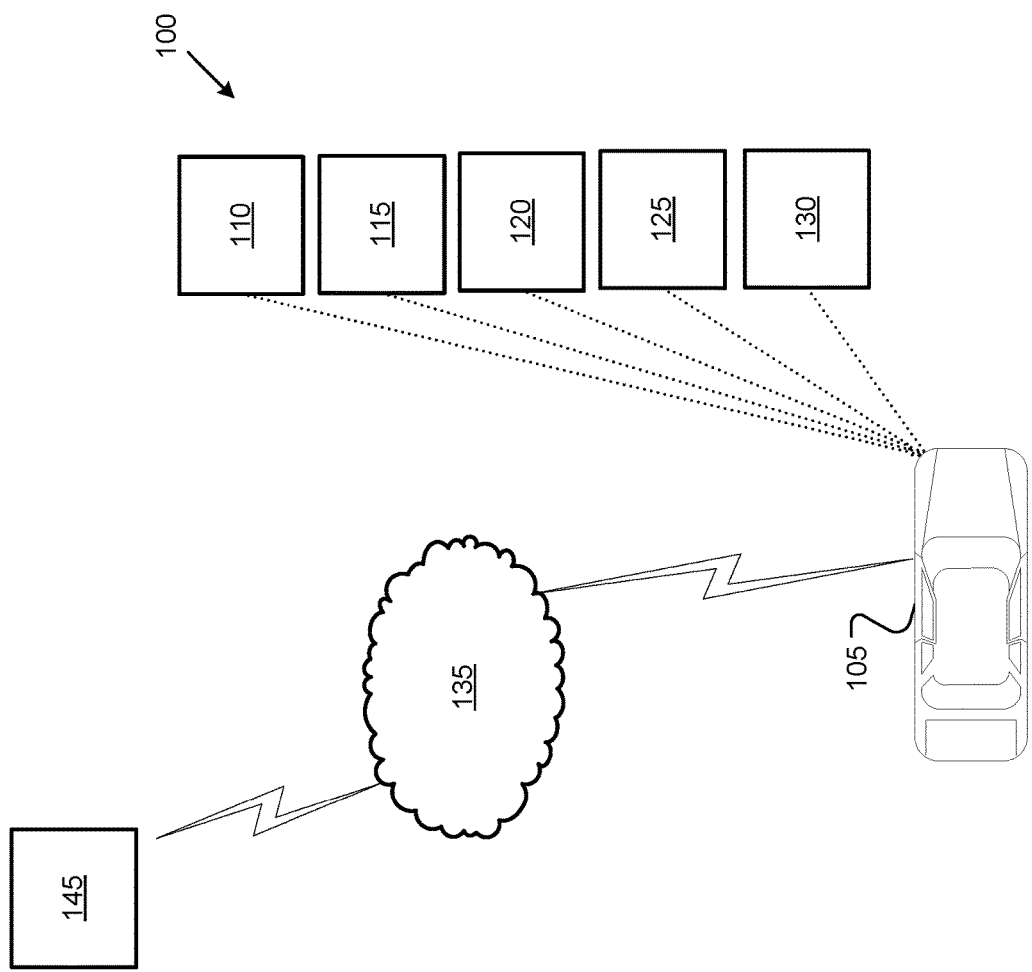
FIG. 1 is a block diagram of an example system for estimating a severity of a road obstacle within a roadway.

FIG. 1 is a block diagram of an example vehicle system 100. The system 100 includes a vehicle 105, which is a land vehicle such as a car, truck, etc. The vehicle 105 includes a computer 110, vehicle sensors 115, actuators 120 to actuate various vehicle components 125, and a vehicle communications module 130. Via a network 135, the communications module 130 allows the computer 110 to communicate with a server 145.

The computer 110 includes a processor and a memory. The memory includes one or more forms of computer readable media, and stores instructions executable by the computer 110 for performing various operations, including as disclosed herein.

The computer 110 may operate a vehicle 105 in an autonomous, a semi-autonomous mode, or a non-autonomous (manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via the vehicle 105 communications module 130 as described further below, more than one processor, e.g., included in electronic controller units (ECUs) or the like included in the vehicle 105 for monitoring and/or controlling various vehicle components 125, e.g., a powertrain controller, a brake controller, a steering controller, etc. Further, the computer 110 may communicate, via the vehicle 105 communications module 130, with a navigation system that uses the Global Position System (GPS). As an example, the computer 110 may request and receive location data of the vehicle 105. The location data may be in a known form, e.g., geo-coordinates (latitudinal and longitudinal coordinates).

The computer 110 is generally arranged for communications on the vehicle 105 communications module 130 and also with a vehicle 105 internal wired and/or wireless network, e.g., a bus or the like in the vehicle 105 such as a controller area network (CAN) or the like, and/or other wired and/or wireless mechanisms.

Via the vehicle 105 communications network, the computer 110 may transmit messages to various devices in the vehicle 105 and/or receive messages from the various devices, e.g., vehicle sensors 115, actuators 120, vehicle components 125, a human machine interface (HMI), etc. In cases where the computer 110 actually comprises a plurality of devices, the vehicle 105 communications network may be used for communications between devices represented as the computer 110 in this disclosure. Further, as mentioned below, various controllers and/or vehicle sensors 115 may provide data to the computer 110.

Vehicle sensors 115 may include a variety of devices such as are known to provide data to the computer 110. For example, the vehicle sensors 115 may include Light Detection and Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects (possibly including second vehicles 106), etc., relative to the location of the vehicle 105. The vehicle sensors 115 may further include camera sensor(s) 115, e.g., front view, side view, rear view, etc., providing images from a field of view inside and/or outside the vehicle 105. The vehicle sensors 115 may also include wheel speed sensor(s) 115, e.g., on each vehicle wheel etc., for estimating vehicle speed. The vehicle sensors 115 may also include inertial measurement unit sensor(s) 115 that can be attached to the vehicle 105 for estimating acceleration of vehicle 105.

The vehicle actuators 120 are implemented via circuits, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, a safety restraint component, etc.

In addition, the computer 110 may be configured for communicating via a vehicle-to-vehicle communication module or interface 130 with devices outside of the vehicle 105, e.g., through a vehicle to vehicle (V2V) or vehicle-to-infrastructure (V2X) wireless communications to another vehicle, to (typically via the network 135) a remote server 145. The module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 include cellular, Bluetooth®, IEEE 802.11, dedicated short range communications (DSRC), and/or wide area networks (WAN), including the Internet, providing data communication services.

The network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC), etc.), local area networks (LAN)

and/or wide area networks (WAN), including the Internet, providing data communication services.

A computer 110 can receive and analyze data from sensors 115 substantially continuously, periodically, and/or when instructed by a server 145, etc. Further, object classification or identification techniques can be used, e.g., in a computer 110 based on lidar sensor 115, camera sensor 115, etc., data, to identify a type of object, e.g., vehicle, person, rock, pothole, bicycle, motorcycle, etc., as well as physical features of objects.

As discussed herein, the vehicle 105 includes one or more sensor(s) 115 disposed about the vehicle 105. Driver-assistance systems (DAS) and advanced driver-assistance systems (ADAS) can use data provided by the sensors 115 to aid drivers with controlling the vehicle 105. DAS can include, but is not limited to, electronic stability control systems, anti-lock braking systems, and traction control systems. ADAS can include, but is not limited to, lane keeping assist (LKA) systems and adaptive cruise control (ACC) systems. For example, a radar sensor 115 can provide radar data indicative of an angle at which the radar sensor 115 transmitted a wave (azimuth angle), a radial distance from the radar sensor 115 to the object (range), and/or a radial velocity of an object with respect to the radar sensor 115 (range rate). However, it is understood that the DAS and/or the ADAS system used by the computer 110 can use data provided by other vehicle sensors 115 as well for decision making purposes. The other vehicle sensors 115 can include, but are not limited to, wheel odometry sensors 115, speed sensors 115, and the like.

The vehicle 105 can also include one or more active safety systems that can use the data provided by the sensors 115 to also aid drivers with controlling the vehicle 105. Active safety systems can include, but are not limited to, a forward collision warning system, a park assist system, a side object detection system, and the like.

Figure 2:
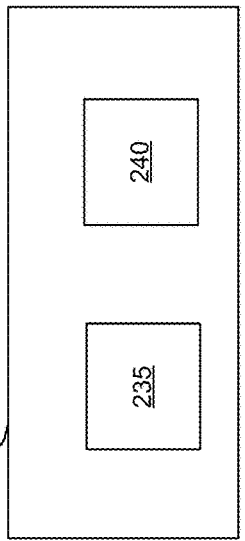
FIG. 2 is a block diagram of an example server within the system.

FIG. 2 is a block diagram of an example server 145. The server 145 includes a computer 235 and a communications module 240. The computer 235 includes a processor and a memory. The memory includes one or more forms of computer readable media, and stores instructions executable by the computer 235 for performing various operations, including as disclosed herein. The communications module 240 allows the computer 235 to communicate with other devices, such as the vehicle 105.

As discussed in greater detail below, the server 145 can receive data pertaining to a vehicle dynamics event, a safety event, an ADAS system event and/or active safety system event to determine infrastructure safety metrics. In some instances, the server 145 generates infrastructure recommendations based on the determined infrastructure safety metrics. For example, the infrastructure recommendations can include, but are not limited to, cyclist infrastructure recommendations, vehicle infrastructure recommendations, and/or pedestrian infrastructure recommendations.

For example, cyclist infrastructure recommendations can include recommendations for adding bike lanes within a certain area, road intersection changes for cyclists, road barriers, pedestrian crosswalks, and/or adding additional signage for alerting motorists. Vehicle infrastructure recommendations can include recommendations for adding additional signage relating to speed limits, traffic calming devices, adding vehicle monitoring devices and/or traffic lights, and/or infrastructure recommendations. Pedestrian infrastructure recommendations can include recommendations for adding additional crosswalks, performing a traffic flow study, and/or infrastructure updates, such as adding additional sidewalks and/or additional lighting.

Figure 3:
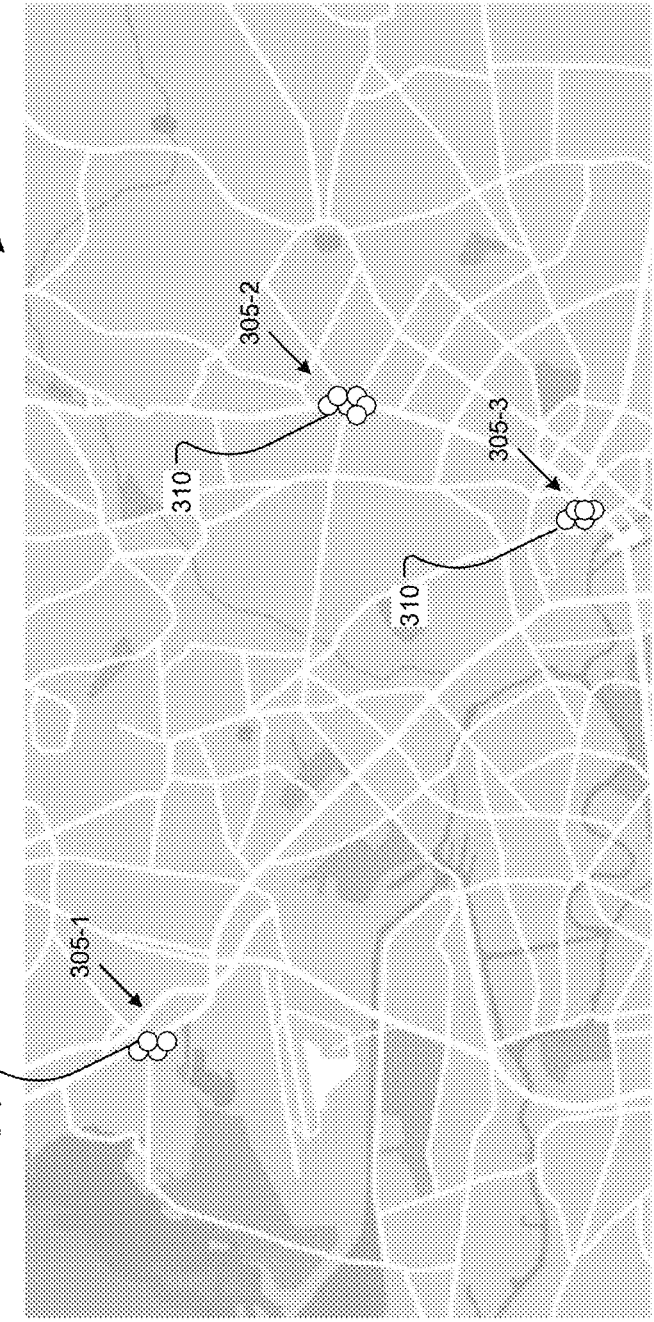
FIG. 3 is an example environment including a vehicle traversing a roadway having a road obstacle.

FIG. 3 illustrates an example map 300 that the server 145 can generate based on the techniques described herein. As shown, the map 300 can include one or more groups 305-1, 305-2, 305-3 of markers 310 that represent detected ADAS system events and/or active safety system events over a defined time period. The number of markers 310 within a group 305-1, 305-2, 305-3 can represent a density of detected events including vehicle dynamic, safety, ADAS system and/or active safety system events occurring at a particular location within the time period. In some instances, each individual marker 310 within the group 305-1, 305-2, 305-3 of markers 310 may represent a particular infrastructure recommendation based on the detected events. Each of the markers 310 include a particular hue to signify the type of detected event for display purposes. For example, markers 310 classified as pedestrian events may comprise a first hue, markers 310 classified as a forgotten cyclist event may comprise a second hue, markers 310 classified as a right-hand turn cyclist event may comprise a third hue, markers 310 classified as an obscured traffic sign may comprise a fourth hue, and so on.

Figure 4:
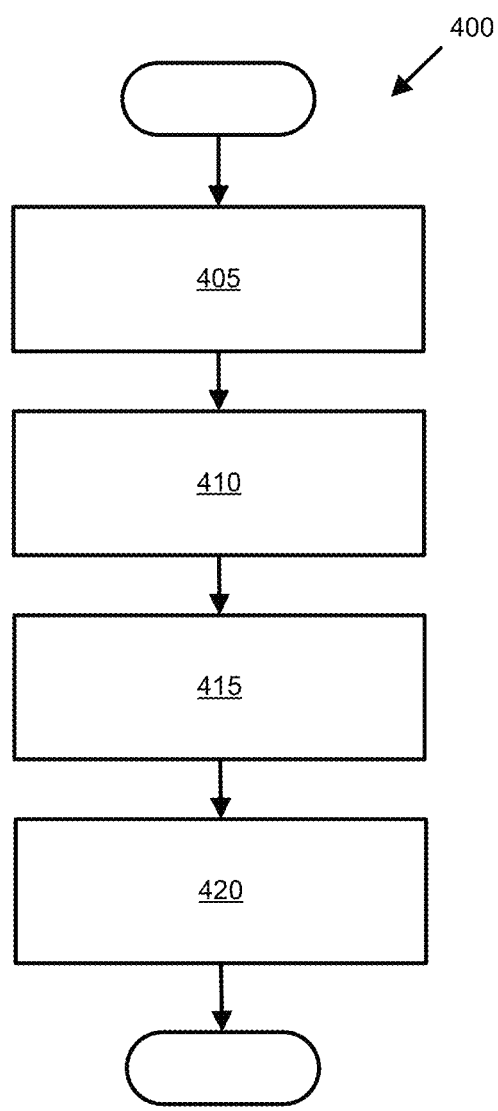
FIG. 4 is a flow diagram illustrating an example process for detecting an ADAS system event and/or active safety system event.

FIG. 4 is a flow chart of an example process 400 for detecting a vehicle dynamic event, a safety event, an ADAS system event and/or active safety system event. Blocks of the process 400 can be executed by the computer 110. The process 400 begins at block 405 in which the computer 110 detects an event, e.g., a detected vehicle event. For example, the ADAS system and/or the active safety system may cause the computer 110 to generate an alert based on received sensor data 115, such as an alert indicating a cyclist is proximate to the vehicle 105, e.g., a forgotten cyclist, a right-hand turn cyclist alert, etc. In another example, the ADAS system and/or the active safety system may cause the computer 110 to modify a vehicle action, such as engaging an automatic emergency braking (AEB) feature when a pedestrian is crossing a roadway.

At block 410, the computer 110 adds the detected vehicle event to a corresponding geoindexed bin. For example, the computer 110 can maintain multiple geoindexed bins, e.g., a database, that maintain detected vehicle events within a particular area corresponding to one or more geoindexes, such as a geoindexed map, or the like. The computer 110 can select which geoindexed bin the vehicle event is associated with based on the GPS coordinates of the vehicle 105 when the detected vehicle event occurs. The computer 110 may also add time period data indicative of when the detected vehicle event occurred. For example, the computer 110 may add time and date data to the detected vehicle event occurred.

At block 415, the computer 110 can classifies the detected vehicle event. For example, the computer 110 can classify the detected vehicle event as affecting a pedestrian, a motorcyclist, a cyclist, or the like, e.g., a pedestrian classification, a motorcyclist classification, a cyclist classification, based on the received sensor data.

At block 420, the computer 110 weights the detected vehicle event. The computer 110 can weight the detected vehicle event according to one or more vehicle 105 parameters. For example, the computer 110 may assign a relatively higher weight to a detected vehicle event when the vehicle 105 has to engage in a vehicle action that is greater than a predetermined vehicle action threshold. For example, the predetermined vehicle action threshold may comprise whether the vehicle speed was altered greater than a vehicle speed threshold, whether the vehicle yaw rate and/or lateral acceleration was altered greater than a yaw rate and/or lateral acceleration threshold, and the like. Thus, vehicle events resulting in vehicle actions that are greater than the predetermined vehicle action threshold are weighted more than vehicle actions that are less than or equal to the predetermined vehicle action threshold. The process 400 then ends.

Figure 5:
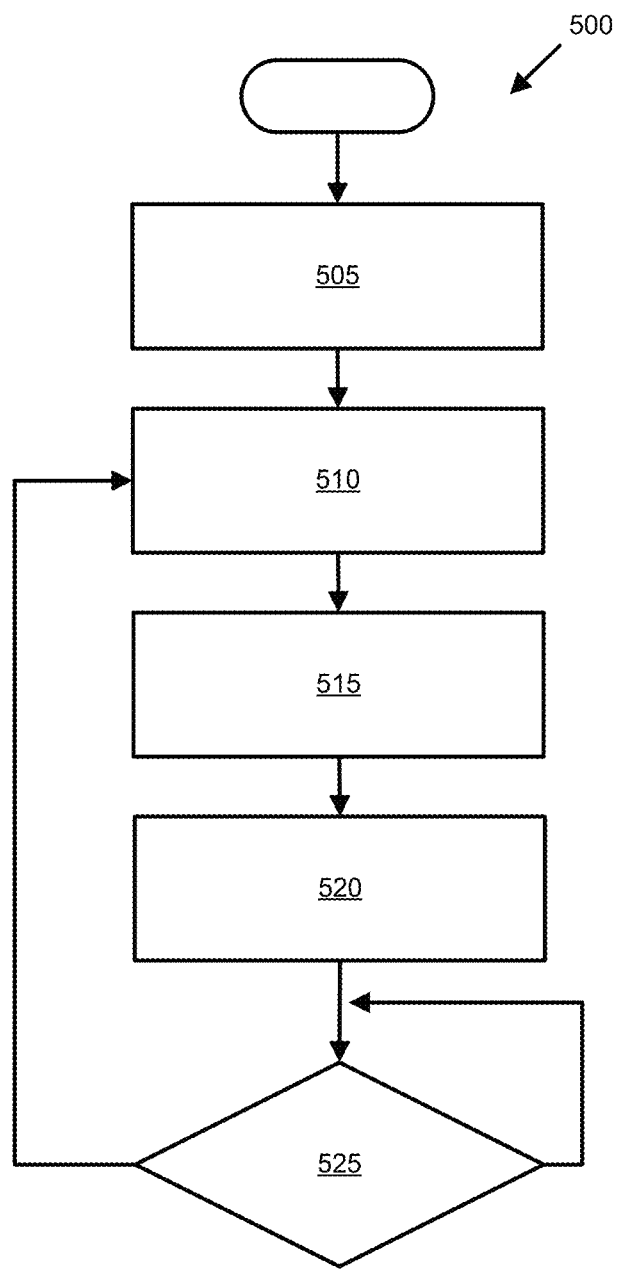
FIG. 5 is a flow diagram illustrating an example process for determining infrastructure recommendations based on geoindexed vehicle event data.

FIG. 5 is a flow chart of an example process 500 for determining infrastructure recommendations based on geoindexed vehicle event data. Blocks of the process 500 can be executed by the computer 235. The process 500 begins at block 505 in which the computer 235 receives geoindexed detected vehicle events from one or more vehicles 105. For example, the server 145 may receive geoindexed detected vehicle event data from multiple vehicles, e.g., a fleet of vehicles, over a predefined time period, e.g., one hour, two hours, one day, one week, etc.

At block 510, the computer 235 normalizes the detected vehicle event data for each geoindex. For example, the computer 235 can use suitable normalizing techniques to normalize the detected vehicle event data according to GPS data corresponding to each geoindex.

At block 515, the computer 235 calculates a road risk metric based on the normalized vehicle event data. The computer 235 can quantify the road risk metric according to Equations 1 and 2:

$$p_i = f(x_1, x_2, \ldots, x_i) \quad \text{Equation 1,}$$

$$r = \Sigma_{i=1}^{m} w_i * p_i * v_i \quad \text{Equation 2,}$$

where r is an overall risk level corresponding to a road segment corresponding to a geoindex, $p_i$ is a property indicative of the detected vehicle event, e.g., lane data, crash data, etc., $x_i$ is defined as a parameter of interest pertaining to the detected vehicle event, e.g., headway, type of alert generated, etc., $w_i$ is a weighting value for $p_i$, $v_i$ is a velocity vector, and m is the number of properties. Thus, the computer 235 computes each property $p_i$ based on underlying sensor data received from the sensors 115 for characterizing the property of interest. The computer 235 can update the map, such as map 300 to include markings 310 indicative of an overall risk level for a particular road segment within a predefined time period. The computer 110 of the vehicle 105 can use the map 300 to alter a vehicle action based on the overall risk level.

At block 520, the computer 235 generates one or more infrastructure recommendations based on the detected vehicle event data and/or the road risk. In an example implementation, the computer 235 can apply one or more data pattern techniques and/or aggregation techniques to the normalized vehicle event data. For example, the computer 235 may cluster one or more detected vehicle events based on the corresponding road risk metrics for each detected vehicle event. The computer 235 may also cluster one or more detected vehicle events based on the classification of the detected vehicle event. In some instances, the computer 235 compares a density of detected vehicle events over a defined time period to a predetermined density threshold. If the density of detected vehicle events over the defined time period is greater than the predetermined density threshold, the computer 235 generates the infrastructure recommendations for the corresponding area referenced by the geoindex. In some implementations, the computer 235 includes a lookup table that relates detected vehicle events to infrastructure recommendations. In this example, the computer 235 retrieves the infrastructure recommendation for the detected vehicle event.

At block 525, the computer 235 transmits the infrastructure recommendation to one or more entities. For example, the computer 235 may transmit the infrastructure recommendation to municipalities that oversee the particular area of interest. At block 530, the computer 235 determines whether additional detected vehicle events for a particular geoindex has been received. If no additional data has been received, the process 500 returns to block 530. Otherwise, the process 500 returns to block 510.

Figure 6:
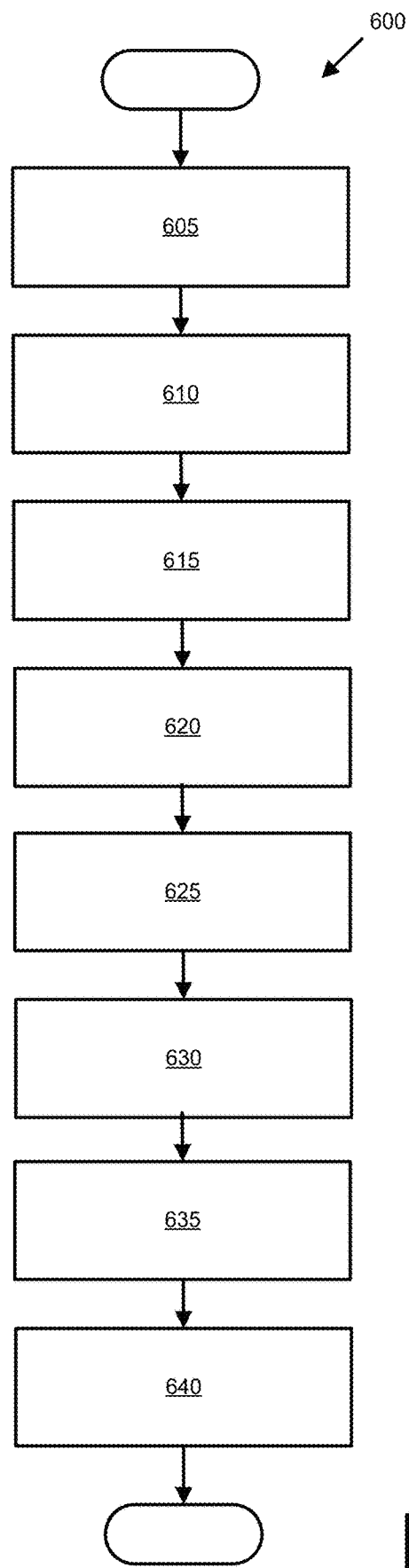
FIG. 6 is a flow diagram illustrating an example process for calculating a risk score for a specific area/region.

FIG. 6 is a flow chart of an example process 600 for calculating a risk score for a specific area/region. The specific area/region can be defined as events occurring within the same time period on the same road. Blocks of the process 600 can be executed by the computer 235.

It is understood that the process 600 may incorporate one or more suitable normalization techniques to normalize collected vehicle event data in some implementations. The process 600 begins at block 605 in which the computer 235 receives detected vehicle event data from one or more vehicles 105. Detected vehicle event data may comprise metadata pertaining to the vehicle event data. For example, the detected vehicle event data can include vehicle body type, vehicle speed, crash severity, e.g., quantified measurement of a vehicle crash, seatbelt usage, number of distinct vehicles within a particular region corresponding to a geoindex, and/or brake data representing a speed rate of change.

At block 610, the computer 235 calculates an event occurrence for each type of detected vehicle event data within a predefined area over a predefined time period. For example, the computer 235 calculates each event occurrence according to vehicle speed, crash severity, seatbelt usage, vehicle body type, braking data and the like within the predefined geographical area occurring within the predefined time period, e.g., one hour, two hours, etc.

At block 615, the computer 235 determines a weighted event occurrence score for each type of detected vehicle event data within the predefined time period. For example, each event occurrence can be assigned to discrete categories based on the detected vehicle event data. For example, similarly valued crash severity occurrences can be assigned to the same category, similarly valued speed rate of change can be assigned to the same category, and so forth.

At block 620, the computer 235 calculates quantiles using the weighted event occurrence score calculated at block 615. For example, the computer 235 calculates the quantiles based on all weighted evidence scores for a particular event type, e.g., crash severity, braking, etc., within the predefined time period. At block 625, the computer 235 determines an event type score based on a comparison of each weighted event occurrence score to the calculated quantiles. At block 630, the computer 235 calculates the risk score by assigning weights to each event type score and summing the event type score. At block 635, the computer 235 assigns a risk label, e.g., "No or Low Risk," "Medium Risk," "High Risk," based on the risk score calculated from block 630 for the particular road segment. At block 640, the computer 235 updates a map such that the markings of the map reflect the risk label and transmits the risk label and the location of the particular road segment to a third party, such as a government municipality or the like. The process 600 then ends.

The description of the present disclosure is merely exemplary in nature and variations that do not depart from the gist of the present disclosure are intended to be within the scope of the present disclosure. Such variations are not to be regarded as a departure from the spirit and scope of the present disclosure.

In general, the computing systems and/or devices described may employ any of a number of computer operating systems, including, but by no means limited to, versions and/or varieties of the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer readable medium (also referred to as a processor readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising a computer including a processor and a memory, the memory including instructions such that the processor is programmed to:
   receive geoindexed detected vehicle event data from at least one remote vehicle occurring within a predefined time period;
   normalize the geoindexed detected vehicle event data according to Global Position System (GPS) data corresponding to a geoindexed map;
   calculate a road risk metric on the normalized geoindexed detected vehicle event data based on a property of the geoindexed detected vehicle event data and a velocity of a host vehicle receiving the geoindexed detected vehicle event data;
   generate an infrastructure recommendation based on the normalized and aggregated geoindexed detected vehicle event data and the road risk metric; and
   operate the host vehicle based at least in part on the normalized and aggregated geoindexed detected vehicle event data and the road risk metric.

2. The system of claim 1, wherein the processor is further programmed to compare a density of detected vehicle events to a predetermined density threshold within the predefined time period; and generate the infrastructure recommendation based on the normalized and aggregated geoindexed detected vehicle event data, the road risk metric, and the density of detected vehicle events based on the comparison.

3. The system of claim 2, wherein the processor is further programmed to generate the infrastructure recommendation based on the normalized and aggregated geoindexed detected vehicle event data and the density of detected vehicle events when the density of detected vehicle events is greater than the predetermined density threshold.

4. The system of claim 2, wherein the processor is further programmed to transmit the infrastructure recommendation to one or more entities.

5. The system of claim 4, wherein at least one entity of the one or more entities comprises a municipality.

6. The system of claim 1, wherein the processor is further programmed to cluster the geoindexed detected vehicle event data based on a type classification of the geoindexed detected vehicle event data.

7. The system of claim 1, wherein the type classification comprises at least one of pedestrian classification, a motorcyclist classification, or a cyclist classification.

8. The system of claim 1, wherein the geoindexed detected vehicle event data comprises vehicle event data detected by an advanced driver-assistance system (ADAS) of the vehicle.

9. The system of claim 1, wherein the road risk metric is calculated by:

$$p_i = f(x_1, x_2, \ldots, x_i),$$

$$r = \sum_{i=1}^{m} w_i * p_i * v_i,$$

where r is the road risk metric corresponding to a road segment corresponding to a geoindex, $p_i$ is a property indicative of the detected vehicle event including lane data or crash data, $x_i$ is defined as a parameter of interest pertaining to the detected vehicle event, including headway and type of alert generated, $w_i$ is a weighting value for $p_i$, $v_i$ is a velocity vector of the host vehicle, and m is the number of properties.

10. The system of claim 1, wherein the infrastructure recommendation comprises at least one of a cyclist infrastructure recommendation, a vehicle infrastructure recommendation, or a pedestrian infrastructure recommendation.

11. A method comprising:
    receiving, via a processor in a host vehicle, geoindexed detected vehicle event data from at least one remote vehicle occurring within a predefined time period;
    normalizing the geoindexed detected vehicle event data according to Global Position System (GPS) data corresponding to a geoindexed map;
    weighting the normalized geoindexed detected vehicle event data based on a vehicle parameter of the remote vehicle, wherein the vehicle parameter includes a vehicle yaw rate and a vehicle acceleration, and wherein the weight is increased when the vehicle yaw rate is greater than a vehicle yaw rate threshold or when the vehicle acceleration is greater than a vehicle acceleration threshold;
    generating an infrastructure recommendation based on the weighted normalized geoindexed detected vehicle event data; and
    operating the host vehicle based at least in part on the normalized and aggregated geoindexed detected vehicle event data and the road risk metric.

12. The method of claim 11, further comprising comparing a density of detected vehicle events to a predetermined density threshold within the predefined time period; and generating the infrastructure recommendation based on the normalized and aggregated geoindexed detected vehicle event data and the density of detected vehicle events based on the comparison.

13. The method of claim 12, further comprising generating the infrastructure recommendation based on the normalized and aggregated geoindexed detected vehicle event data and the density of detected vehicle events when the density of detected vehicle events is greater than the predetermined density threshold.

14. The method of claim 12, further comprising transmitting the infrastructure recommendation to one or more entities.

15. The method of claim 14, wherein at least one entity of the one or more entities comprises a municipality.

16. The method of claim 11, further comprising clustering the geoindexed detected vehicle event data based on a type classification of the geoindexed detected vehicle event data.

17. The method of claim 11, wherein the type classification comprises at least one of pedestrian classification, a motorcyclist classification, or a cyclist classification.

18. The method of claim 11, wherein the geoindexed detected vehicle event data comprises vehicle event data detected by an advanced driver-assistance system (ADAS) of the vehicle.

19. The method of claim 11, wherein the geoindexed detected vehicle event data comprises vehicle event data detected by an active safety system of the vehicle, a vehicle dynamic system of the vehicle, or a safety system of the vehicle.

20. The method of claim 11, wherein the infrastructure recommendation comprises at least one of a cyclist infrastructure recommendation, a vehicle infrastructure recommendation, or a pedestrian infrastructure recommendation.

* * * * *